(12) United States Patent
Xhakoni et al.

(10) Patent No.: US 12,514,008 B2
(45) Date of Patent: Dec. 30, 2025

(54) IMAGE SENSOR ARRANGEMENT, IMAGE SENSOR DEVICE AND METHOD FOR OPERATING AN IMAGE SENSOR ARRANGEMENT

(71) Applicant: ams Sensors Belgium BV, Berchem (BE)

(72) Inventors: Adi Xhakoni, Kessel Lo (BE); Corneliu-Mihai Tobescu, Willen B. Wil (CH)

(73) Assignee: ams Sensors Belgium BV, Berchem (BE)

( * ) Notice: Subject to any disclaimer, the term of this patent is extended or adjusted under 35 U.S.C. 154(b) by 142 days.

(21) Appl. No.: 18/284,170

(22) PCT Filed: Mar. 2, 2022

(86) PCT No.: PCT/EP2022/055271
§ 371 (c)(1),
(2) Date: Sep. 26, 2023

(87) PCT Pub. No.: WO2022/200007
PCT Pub. Date: Sep. 29, 2022

(65) Prior Publication Data
US 2024/0162271 A1    May 16, 2024

(30) Foreign Application Priority Data
Mar. 26, 2021    (DE) ...................... 10 2021 107 730.3

(51) Int. Cl.
*H10F 39/18* (2025.01)
*H04N 25/131* (2023.01)
(Continued)

(52) U.S. Cl.
CPC ....... *H10F 39/1825* (2025.01); *H04N 25/131* (2023.01); *H04N 25/531* (2023.01);
(Continued)

(58) Field of Classification Search
CPC ............... H04N 25/131; H04N 25/531; H04N 25/532; H04N 25/77; H04N 25/78;
(Continued)

(56) References Cited

U.S. PATENT DOCUMENTS 7,579,665 B2    8/2009 Yokoyama et al.
2003/0209651 A1    11/2003 Iwasaki
(Continued)

FOREIGN PATENT DOCUMENTS

DE    10 2018 126 421 A1    4/2020
JP    2017-175102 A    9/2017
(Continued)

OTHER PUBLICATIONS

International Search Report issued for corresponding International Patent Application No. PCT/EP2022/055271 on Jun. 23, 2022 (3 pages).

(Continued)

*Primary Examiner* — Kelly L Jerabek
(74) *Attorney, Agent, or Firm* — HAUPTMAN HAM, LLP

(57) ABSTRACT

An image sensor arrangement includes a first sensor layer having a first group of pixels. Each pixel of the first group includes a photodiode configured to detect electromagnetic radiation in a first wavelength range. The image sensor arrangement also includes a second sensor layer having a second group of pixels. Each pixel of the second group includes a photodiode configured to detect electromagnetic radiation in a second wavelength range. The image sensory arrangement further includes a readout layer having a readout circuit configured to read out electrical signals from the pixels of the first and the second group. The second sensor layer is arranged between the first sensor layer and the readout layer. The second wavelength range is outside a (Continued)

wavelength range detectable by the first sensor layer. The first sensor layer is attached to the second sensor layer by hybrid bonding.

16 Claims, 4 Drawing Sheets

(51) Int. Cl.
*H04N 25/531* (2023.01)
*H04N 25/532* (2023.01)
*H04N 25/77* (2023.01)
*H04N 25/78* (2023.01)
*H10F 39/00* (2025.01)

(52) U.S. Cl.
CPC ........... *H04N 25/532* (2023.01); *H04N 25/77* (2023.01); *H04N 25/78* (2023.01); *H10F 39/1843* (2025.01); *H10F 39/8053* (2025.01); *H10F 39/809* (2025.01); *H10F 39/811* (2025.01)

(58) Field of Classification Search
CPC ............. H10F 39/1825; H10F 39/1843; H10F 39/8053; H10F 39/809; H10F 39/811; H10F 39/182; H10F 39/184; H10F 39/813; H10F 39/806
See application file for complete search history.

(56) References Cited

U.S. PATENT DOCUMENTS

| | | |
|---|---|---|
| 2017/0154929 A1 | 6/2017 | Leem et al. |
| 2018/0114814 A1 | 4/2018 | Yun et al. |
| 2019/0173015 A1 | 6/2019 | Shibuya et al. |
| 2020/0105812 A1 | 4/2020 | Sze |
| 2020/0412980 A1 | 12/2020 | Agranov et al. |
| 2021/0377473 A1* | 12/2021 | Sano ................... G01S 17/894 |
| 2023/0215901 A1* | 7/2023 | Yamashita ............ H10F 39/813 257/292 |

FOREIGN PATENT DOCUMENTS

| | | |
|---|---|---|
| JP | 2017-201687 A | 11/2017 |
| JP | 2019-117330 A | 7/2019 |
| JP | 2020-20681 A | 2/2020 |
| WO | 2016/056396 A1 | 8/2017 |
| WO | 2020/070887 A1 | 4/2020 |

OTHER PUBLICATIONS

Written Opinion issued for corresponding International Patent Application No. PCT/EP2022/055271 on Jun. 23, 2022 (6 pages).
Takemoto et al., "Multiband Imaging CMOS Image Sensor with Multi-Storied Photodiode Structure", Sensors 2018, 18 (6), 1688, pp. 1-9 (9 pages), cited in the Specification.

* cited by examiner

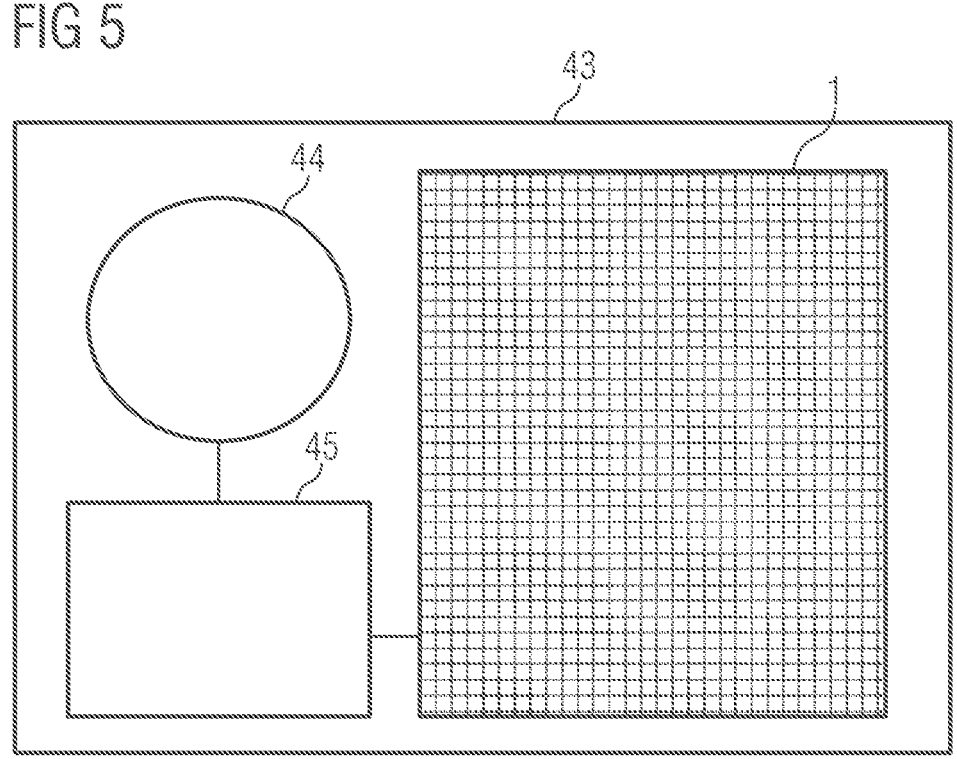

IMAGE SENSOR ARRANGEMENT, IMAGE SENSOR DEVICE AND METHOD FOR OPERATING AN IMAGE SENSOR ARRANGEMENT

The present invention relates to an image sensor arrangement, an image sensor device and a method for operating an image sensor arrangement. The image sensor arrangement is configured to detect electromagnetic radiation in two wavelength ranges.

BACKGROUND OF THE INVENTION

CMOS image sensors are used in a wide range of applications, such as for camera modules and smartphones, tablet computers, laptops etc. Some of these applications, such as photography, rely on sensitivities in the visible optical domain while other applications, such as 3D imaging and identification, require the image sensor to be sensitive in the infrared (IR) domain. For example, the infrared domain is used in dark environments or at least in situations with limited brightness. The infrared domain can also be used to enhance normal RGB images: it brings "texture" because infrared radiation can "see through" certain conditions like haze that light in the visible wavelength domain cannot.

Due to space constraints in state of the art devices, it is desirable to provide an image sensor device that is sensitive in both the visible and in the infrared domain. To this end, an image sensor arrangement comprises pixels sensitive to a certain portion of the visible spectrum as well as pixels sensitive to a certain portion of the infrared spectrum. Silicon-based photodiodes are a common choice in this connection, as these diodes are sensitive over a broad wavelength range between 190 nm and 1100 nm and therefore cover the electromagnetic spectrum in both the visible and in the near-infrared (NIR) domain.

Pixels for receiving visible light information are typically arranged in a sensor layer according to a two-dimensional array or matrix in order to obtain a sufficient spatial resolution of an image scene. Moreover, each pixel may comprise subpixels, each subpixel being configured to detect light of a specific color, for example red, green and blue (RGB). Typically, the subpixels are arranged in a specific pattern, for example according to the so-called Bayer pattern.

One conventional approach to realize an image sensor sensitive to both visible and IR light is to arrange additional pixels for NIR light in the same (silicon) substrate. Implementing an additional pixel for receiving NIR light information in such image sensors is typically achieved by sacrificing one of the subpixels, for example one subpixel for detecting green light. However, this leads to several drawbacks, in particular to a deterioration of the image perception and/or a loss of spatial resolution in the visible domain.

Another approach is suggested by Takemoto et al. (see Takemoto et al.: "Multiband Imaging CMOS Image Sensor with Multi-Storied Photodiode Structure"). They disclose a multiband imaging CMOS image sensor with a multi-storied photodiode structure, which comprises two photodiode arrays for capturing visible RGB and NIR light at the same time. A top silicon substrate has a pixel array for visible RGB light, and a bottom silicon substrate has a pixel array for NIR light that passes through the top substrate. The two substrates each comprise wiring layers, which are bonded to each other face-to-face.

One big issue is that because of the NIR pixels beneath the visible light pixels, the visible light pixels are exposed to NIR light as well. This affects the color reconstruction and as a result, in the digital image colors get a NIR contribution equivalent to an amplitude offset. Another drawback is that because of the upper first substrate and the wiring layers between the two substrates, light passing the first substrate is highly attenuated by blocking or scattering effects. This in turn leads to a poor quantum efficiency (QE) for NIR light.

Therefore, an object to be achieved is to provide an image sensor arrangement which overcomes the above mentioned drawbacks. In particular, the image sensor arrangement is capable of sensing light in at least two wavelength ranges and provides improved image perception and quantum efficiency.

This object is achieved with the subject-matter of the independent claims. Further developments and embodiments are described in dependent claims.

SUMMARY OF THE INVENTION

The improved image sensor arrangement is based on the idea of using two wavelength ranges, wherein a first sensor layer is spectral responsive to only one of these wavelength ranges, while a second sensor layer is spectral responsive to the other wavelength range. For example, the first wavelength range comprises visible light. The second wavelength range may comprise short wavelength infrared (SWIR) light (instead of NIR light). SWIR includes the wavelengths from 1.4 µm to 3.0 µm, whereas NIR includes the wavelengths from 780 nm to 1.4 µm. A dedicated SWIR sensor can be arranged under a visible light sensor. In contrast to NIR light, SWIR light does not affect the photodiodes of the visible light sensor, i.e. die visible light sensor is not sensitive to SWIR light. A common readout circuit can be arranged under the second sensor layer and connected to the pixels of both sensor layers in an appropriate way.

Here and in the following, the term pixel refers to a light receiving element, which might be arranged in a two-dimensional array with other pixels. The pixel might also include circuitry for controlling signals to and from the pixel. The pixels may also include respective wavelength filters for detecting light in a particular wavelength range. Visible light pixels refer to pixels which are capable to sense light in the visible wavelength range, in particular in the red, green and/or blue wavelength range. IR/SWIR pixels refer to pixels which are capable to sense light in the infrared domain, especially in the short wavelength infrared domain. The term light may refer to electromagnetic radiation in general, including IR radiation, SWIR and visible light. Accordingly, green, blue, red and SWIR light will refer to light in the respective wavelength range.

In an embodiment, an image sensor arrangement comprises a first sensor layer comprising a first group of pixels, each pixel of the first group comprising a photodiode configured to detect electromagnetic radiation in a first wavelength range. The image sensor arrangement further comprises a second sensor layer comprising a second group of pixels, each pixel of the second group comprising a photodiode configured to detect electromagnetic radiation in a second wavelength range. The image sensor arrangement further comprises a readout layer comprising a readout circuit being configured to read out electrical signals from the pixels of the first and the second group. The second sensor layer is arranged between the first sensor layer and the readout layer. The second wavelength range is outside a wavelength range detectable by the first sensor layer.

The first sensor layer has a main plane of extension. The first sensor layer comprises a main surface and a rear surface. In an embodiment, a wiring of the pixels of the first group may be arranged at the main surface of the first sensor layer. The pixels of the first group can be arranged as a two-dimensional array or as a pixel matrix. The pixels of the first group can be arranged next to each other in lateral directions, where the lateral directions run parallel to the main plane of extension of the first sensor layer. The first sensor layer comprises for example at least 1 million pixels of the first group. In at least some embodiments, the first wavelength range comprises visible light. The first group of pixels may be configured to detect electromagnetic radiation in the visible wavelength range.

Alternatively or additionally, the first wavelength range comprises NIR light. The first group of pixels may be configured to detect electromagnetic radiation in the NIR wavelength range. This can mean that the first sensor layer comprises pixels for detecting visible light and further pixels for detecting NIR light. This can further mean that the first sensor layer comprises pixels that are capable to detect light in both the visible and NIR spectra.

In an embodiment each pixel of the first group detects light of the same wavelength range. However, in another embodiment, the first group of pixels comprises different subsets of pixels, wherein each subset is configured to detect a particular wavelength range within the first wavelength range. According to at least some embodiments, a first subset of pixels detects light in the red (R) wavelength range, a second subset of pixels detects light in the green (G) wavelength range and a third subset detects light in the blue (B) wavelength range. As such, an RGB pixel layer can be formed. The pixels of different subsets may be arranged according to a specific pattern, e.g. according to the Bayer pattern (RGGB). The photodiodes of the pixels of the first group are each configured to convert electromagnetic radiation into an electrical signal. Each photodiode of a pixel may have its own floating diffusion node and/or own components of a control circuit.

It is also possible that each pixel comprises several subpixels for detecting light in different wavelength ranges. Each subpixel may comprise a corresponding photodiode. In one embodiment, each pixel comprises four subpixels arranged in a Bayer pattern (RGGB). The subpixels with respective photodiodes may share a common floating diffusion node and/or common components of a control circuit.

In an embodiment, the rear surface of the first sensor layer faces the incoming electromagnetic radiation. In such embodiment the rear surface may therefore also be called radiation entrance side. A configuration, where the wiring of the pixels is arranged at the main surface and where the sensor layer is irradiated from its rear surface, may be called backside illumination (BSI) configuration. Thus, the first sensor layer may be in a BSI configuration. However, that the main surface, where the wiring is arranged, is irradiated, is likewise possible. Such configuration is called frontside illumination (FSI) configuration.

The second sensor layer also has a main plane of extension. The main plane of the second sensor layer can be parallel to the main plane of the first sensor layer. The second sensor layer also comprises a main surface and a rear surface. In a vertical direction, the second sensor layer is arranged below the first sensor layer. The vertical direction refers to a direction which runs perpendicular to the main plane of extension of the first and the second sensor layer. This can mean that the first sensor layer in arranged between the second sensor layer and the incoming electromagnetic radiation. The main surface of the second sensor layer may be arranged such that it faces the first sensor layer, or such that it faces the readout layer.

In an embodiment, a wiring of the pixels of the second group may be arranged at the main surface of the second sensor layer. The pixels of the second group can be arranged as a two-dimensional array or as a pixel matrix. The pixels of the second group can be arranged next to each other in lateral directions. The second sensor layer comprises for example at least 1 million pixels of the second group. However, the second sensor layer may comprise fewer than 1 million pixels of the second group, or fewer pixels of the second group than pixels of the first group in the first sensor layer.

The pixels of the second group may each be configured to detect electromagnetic radiation in a same range within the second wavelength range. However, it is also possible that the pixels of the second group are configured to detect different ranges within the second wavelength range. The photodiodes of the pixels of the second group are each configured to convert electromagnetic radiation within the second wavelength range into an electrical signal.

The second wavelength range is outside a wavelength range detectable by the first sensor layer. This can mean that the first sensor layer comprises spectral responsivity exclusively in the first wavelength range. The first sensor layer might not be sensitive in the second wavelength range. This can mean that the first sensor layer comprises no spectral responsivity in the second wavelength range. Electromagnetic radiation in the second wavelength range passes the first sensor layer unhindered. This is because the first sensor layer may comprise a sensor material that exhibits a bandgap too large for electromagnetic radiation in the second wavelength range. Only photons with sufficient energy to excite electrons across the material's bandgap will produce a significant photocurrent. The photon energy within the second wavelength range may be too small to be sensed by the first sensor layer. This can mean that a minimal wavelength of the second wavelength range is larger than a maximal wavelength being detectable by the first sensor layer.

According to at least some embodiments, the second wavelength range comprises short wavelength infrared radiation. The second group of pixels may be configured to detect electromagnetic radiation in the SWIR range.

In an embodiment, the number of pixels of the first group in the first sensor layer matches the number of pixels of the second group in the second sensor layer. This can mean that each pixel of the second group is assigned to one pixel of the first group. In such embodiment, the spatial resolutions of the two corresponding arrays are equal.

However, it is also possible, that the number of pixels of the first group exceeds the number of pixels of the second group, or vice versa. By way of example, each pixel of the second group (e.g. SWIR pixels) can be assigned to four pixels or subpixels, respectively, of the first group (e.g. visible light pixels). For example, each SWIR pixel is assigned to four pixels/subpixels of a Bayer pattern (RGGB). This can mean that in this example a pixel area of an SWIR pixel is four times larger than a pixel area of one of the visible light pixels. By means of a larger pixel area, the pixel is more sensitive as more light per pixel can be detected.

It is likewise possible, that one pixel of the first group is assigned to more than one pixel of the second group. It is further possible, that the number of pixels of the first group is uncorrelated to the number of pixels of the second group, such that there is no assignment between pixels of different groups.

The readout layer also has a main plane of extension. The main plane of the readout layer can be parallel to the main plane of the first sensor layer and of the second sensor layer, respectively. In the vertical direction, the readout layer is arranged below the second sensor layer. This means that the second sensor layer in arranged between the first sensor layer and the readout layer. The readout layer is electrically connected to the first sensor layer and to the second sensor layer. The electrical connection can be established by any appropriate means.

A wiring of the readout circuit is arranged at a main surface of the readout layer. The readout layer may be arranged such that its main surface faces the second sensor layer. The readout circuit can be configured to read out the electrical signals provided by the photodiodes of the first and second group of pixels. The readout circuit can comprise an input where the electrical signals of the photodiodes can be provided. The readout circuit can further be configured to operate the pixels.

The image sensor arrangement can detect light in two distinct wavelength ranges, which is beneficial from a cost-effective point of view. For example, the image sensor arrangement can detect visible light and SWIR at the same time. In comparison to other multispectral sensors (e.g. RGB+NIR), no tradeoff with image quality is present. No pixels of the first group have to be removed from the first array, as the pixels of the second group are not integrated in the first array, but in a separate second array beneath the first array. This means that the spatial resolution of both first array and second array can be high. The quantum efficiency (QE) of the first group of pixels (e.g. silicon-based visible light pixels) in the first sensor layer is 0% for the second wavelength range (e.g. SWIR domain). This means that SWIR light does not contribute to a color shift in the visible range. Advantageously, no color correction is needed to filter an SWIR component out of the visible spectrum. A high image perception can be maintained.

In an embodiment, an image sensor arrangement comprises a first sensor layer comprising a first group of pixels, each pixel of the first group comprising a photodiode configured to detect electromagnetic radiation in the visible wavelength range. The image sensor arrangement further comprises a second sensor layer comprising a second group of pixels, each pixel of the second group comprising a photodiode configured to detect electromagnetic radiation in the short wavelength infrared range. The image sensor arrangement further comprises a readout layer comprising a readout circuit being configured to read out electrical signals from the pixels of the first and the second group. The second sensor layer is arranged between the first sensor layer and the readout layer.

In one embodiment of the image sensor arrangement, the first sensor layer is attached to the second sensor layer. According to an aspect of the disclosure, the first sensor layer is attached to the second sensor layer by electrical contacts. The electrical contacts may be formed between the first sensor layer and the second sensor layer. Thus, the pixels of the first group can be electrically connected to the pixels of the second group. This can mean that a wiring of a respective pixel of the first group is electrically connected to a wiring of a respective pixel of the second group by means of an electrical contact. The electrical contacts can comprise metal bumps. For example, the electrical contacts are formed by hybrid bonding.

In one embodiment of the image sensor arrangement, the first sensor layer is attached to the second sensor layer by hybrid bonding. Electrical interconnections are formed between the pixels of the first group and the pixels of the second group. Hybrid bonding refers to any bonding technique, where a permanent bond between two layers is established that combines a dielectric bond with an embedded metal to form electrical interconnections. For example, the hybrid bond can be established by means of an adhesive. Metal bumps can be embedded in the adhesive and electrically connect the first sensor layer with the second sensor layer.

As another example, the dielectric bond can be established by an oxide interface, where each of the first and the second sensor layer comprise a respective oxide layer facing each other. Bonding the two oxide layers to each other may be conducted in course of a direct bonding, or fusion bonding process. Copper pads can be processed in parallel with the respective oxide layer. In this case, electrical contacting can be achieved during annealing via metal diffusion bonding.

Typically, the first sensor layer and the second sensor layer comprise a substrate where the photodiodes and possibly some circuitry are arranged. An oxide layer may be arranged on top of the substrate, wherein wirings are embedded in the oxide layer and electrically connect the photodiodes and the circuitry. The first sensor layer and the second sensor layer may be arranged such that the respective oxide layers face each other for a direct bonding process. The wirings within the oxide layers can be utilized to electrically connect the pixels of the first group with the pixels of the second group.

By means of the permanent bond the first sensor layer and the second sensor layer can be aligned to each other. No moving parts are present. The electrical interconnection of the pixels of the first group with the pixels of the second group can be used to allow the pixels to share a common readout path. The readout path can be a column bus. The electrical signals can be transmitted sequentially to the readout circuit. This configuration is particularly relevant if the pixels of both groups are to be operated in a rolling shutter mode. In this case, the readout circuit is less space consuming.

In one embodiment of the image sensor arrangement, the second sensor layer is attached to the readout layer. According to an aspect of the disclosure, the second sensor layer is attached to the readout layer by electrical contacts. The electrical contacts may be formed between the second sensor layer and the readout layer. Thus, the pixels of the second group can be electrically connected to the readout circuit.

This can mean that a wiring of a respective pixel of the second group is electrically connected to a wiring of the readout circuit by means of an electrical contact. The electrical contacts can comprise metal bumps. For example, the electrical contacts are formed by hybrid bonding.

In one embodiment of the image sensor arrangement, the second sensor layer is attached to the readout layer by hybrid bonding, such that electrical interconnections are formed between the pixels of the second group and the readout circuit.

As mentioned above, hybrid bonding refers to any bonding technique, where a permanent bond between two layers is established that combines a dielectric bond with an embedded metal to form electrical interconnections. The above-mentioned examples also apply to this embodiment.

Typically, also the readout layer comprises a substrate where the readout circuit is arranged. An oxide layer may be arranged on top of the substrate, wherein a wiring is embedded in the oxide layer and electrically connects different parts of the readout circuit. The second sensor layer and the readout layer may be arranged such that their respective oxide layers face each other for a direct bonding process. The wirings within the oxide layers can be utilized to electrically connect the pixels of the second group to parts of the readout layer.

By means of the permanent bond the second sensor layer can be aligned to the readout layer. No moving parts are present. The electrical interconnection of the pixels of the second group to the readout circuit allows for a separate readout path beside the readout path for the pixels of the first group. This configuration is particularly relevant if the pixels of the first group are to be operated in a rolling shutter mode, while the pixels of the second group are to be operated in a global shutter mode. In this case, global shutter can be used for the pixels of the second group, which leads to a lower power consumption, as in global shutter mode the illumination time is shorter.

If the pixels of the second group are connected to the readout circuit via a separate readout path, electrical interconnection to the pixels of the first group is no longer necessary. This means that at least some metal layers/metal bumps between the pixels of the first group and pixels of the second group are not needed. Metal layers block, scatter and/or reflect electromagnetic radiation. These embodiments therefore have a high quantum efficiency, as a great portion of incoming light reaches the second sensor layer without being influenced by metal layers.

In an embodiment, the image sensor arrangement further comprises at least one through-substrate-via, TSV. The at least one through-substrate-via penetrates the second sensor layer and electrically connects the pixels of the first group in the first sensor layer with the readout circuit in the readout layer.

The TSV completely penetrates the second sensor layer. This means that the TSV reaches from the main surface to the rear surface of the second sensor layer. The TSV may be formed by a via hole in the second sensor layer. In addition, the TSV may completely penetrate also the first sensor layer. Thus, the via hole may also be present in the first sensor layer. In this case, the TSV reaches from a radiation entrance side of the first sensor layer to the rear surface of the second sensor layer. The latter approach may be beneficial from a production engineering perspective.

The TSV may comprise a metallization which electrically connects the wiring of the first sensor layer with a wiring of the readout layer. The TSV may further comprise an isolation layer which isolates the metallization from the second sensor layer and optionally from the first sensor layer. For that purpose the isolation layer is arranged on sidewalls of the via hole. The metallization may be arranged on the isolation layer and form contact areas at the main surface and the rear surface of the second sensor layer and/or the first sensor layer. The remaining via hole may be filled with a filling material. As an alternative, the metallization may completely fill the remaining via hole.

The TSV provides a readout path for reading out the electrical signals of the pixels of the first group. In some embodiments, also the electrical signals from the pixels of the second group are read out via the TSV. The electrical signals can be read out via the TSV sequentially, i.e. one by one. As such, the TSV features a readout path for operating the pixels in a rolling shutter mode. The TSV can be electrically connected to only one pixel. It is also possible that the TSV is electrically connected to more than one pixel.

The image sensor arrangement may comprise a plurality of TSVs, each TSV being electrically connected to one or more pixel. For example, each TSV is electrically connected to the pixels of one row of an array of pixels. By means of the TSV no wire bonding is needed and the floor space of the image sensor arrangement can be small. Moreover, the first sensor layer and the second sensor layer can share one common readout layer.

In an embodiment, the image sensor arrangement further comprises a dual band filter being arranged between the first sensor layer and a source of electromagnetic radiation to be detected. The dual band filter is configured to block electromagnetic radiation apart from at least a portion of the first wavelength range and at least a portion of the second wavelength range.

In the vertical direction, the dual band filter is arranged on or above the first sensor layer, such that the first sensor layer is arranged between the dual band filter and the second sensor layer. For example, the dual band filter comprise an organic material. The dual band filter can also be a dielectric interference filter. The dual band filter may be directly attached to the first sensor layer or be arranged in a predefined distance to the first sensor layer.

The dual band filter is provided for adjusting the sensitivity to a certain portion of the spectrum of incident electromagnetic radiation. The dual band filter is transmissive for at least a portion of the first wavelength range and for at least a portion of the second wavelength range. Here and in the following "transmissive" or "translucent" refers to a transparency of at least 80% or at least 90%. This means that the dual band filter transmits electromagnetic radiation of the first and the second wavelength range towards the first sensor layer and the second sensor layer. The dual band filter blocks electromagnetic radiation of other wavelengths. The first wavelength range and the second wavelength range may be separated from each other by a further wavelength range. For example, the dual band filter is transmissive for visible light, in particular for the red, green and blue wavelength ranges. Moreover, the dual band filter may be transmissive for at least a portion of the short wavelength infrared range. For example, the dual band filter is transmissive for a band around 1.4 μm, 1.5 μm and/or 1.6 μm. The window of the dual band filter for SWIR light might be small. For example, the bandwidth of the dual band filter in the SWIR domain is ±5 nm, ±10 nm or ±50 nm. In contrast, the dual band filter may be opaque for wavelengths in the NIR domain, i.e. from 780 nm to 1.4 μm.

If the first sensor layer is based on silicon, the photodiodes are sensitive to NIR light. The NIR light contribution, which would degrade the color reconstruction of the digital image, is significantly reduced by means of the dual band filter. A dedicated NIR filter is not needed. Besides, all other unwanted wavelengths can be filtered out of the spectrum. On the other side, the QE of RGB pixels (visible light pixels) implemented with silicon is 0% for SWIR light. Hence, the dual band filter with an opening at the visible spectrum and a small opening at the SWIR spectrum does not negatively affect the performance of the RGB pixels.

In an embodiment, instead of a dual band filter, the image sensor arrangement can comprise a stop band filter being arranged between the first sensor layer and a source of electromagnetic radiation to be detected. The stop band filter can be configured to block electromagnetic radiation between the first wavelength range and the second wavelength range. This can mean that the stop band filter is configured to remove the part of electromagnetic radiation from the end of the first wavelength range up to the second wavelength range. The stop band filter may be opaque for these intermediate wavelengths. Thus, unwanted wavelengths can be removed from the optical spectrum to be detected. The first wavelength range can be the visible range and the second wavelength range can be the SWIR range. In this case, NIR light is filtered out of the spectrum.

In an embodiment, the image sensor arrangement further comprises a lens or an array of lenses being arranged between the first sensor layer and a source of electromagnetic radiation to be detected. The lens or the array of lenses is configured to direct incoming light towards the first sensor layer and the second sensor layer. The lens or the array of lenses can be used to direct the light through openings of metals layers (for example metal layers comprised by the pixel wirings or the hybrid bonding interface) between the first sensor layer and the second sensor layer. The lens can be a microlens, and the array of lenses can be an array of microlenses.

In an embodiment, the first sensor layer comprises a semiconductor material, in particular silicon. In an embodiment the readout layer comprises a semiconductor material, in particular silicon.

Semiconductor materials can be ideally processed due to the numerous methods available. As mentioned above, silicon-based photodiodes are a common choice, as these diodes are sensitive over a broad wavelength range between 190 nm and 1100 nm and therefore cover the relevant part of the electromagnetic spectrum in the visible domain. In addition, due to the large bandgap of silicon, silicon-based photodiodes show a superior noise performance compared to other photodiodes, such as germanium-based photodiodes. The electrical and optical properties of silicon are not only suited for the realization of photodiodes but also for circuit components.

In an embodiment, the second sensor layer comprises one of germanium, indium gallium arsenide and a quantum dot layer or any other material having a suitable bandgap for spectral response to electromagnetic radiation in the second wavelength range.

Silicon photodiodes are not sensitive to SWIR light. As such, a sensor for detecting SWIR light has to comprise other materials. Photodiodes based on germanium cover a wavelength range from 400 nm to 1700 nm, while photodiodes based on indium gallium arsenide cover a wavelength range from 800 nm to 2600 nm. Such photodiodes therefore cover at least parts of the SWIR wavelength range. Photodiodes based on a quantum dot layer can be designed such that the desired wavelength range can be detected. In general, any material can be used that has a suitable bandgap and that is compatible with the other materials used. Since the main part of the circuitry is located in the readout layer, the second sensor layer can only contain photodiodes and, accordingly, does not have to be designed for good electrical behavior.

In an embodiment, the pixels of the first group and the pixels of the second group are configured to be read out by the readout circuit in a rolling shutter mode.

An image is acquired by converting light into an electronic signal at the photosensitive region. Both of the light intensity and exposure time or integration time has influence on the amount of signals generated. In CMOS image sensors, there are two kinds of electronic shutter modes, rolling shutter and global shutter. For the rolling shutter mode, pixels rows are exposed sequentially controlled by a reset signal, starting, for example, at the top row and proceeding to the bottom row. During the illumination the pixels are sequentially exposed and read out row-by-row, such that the readout process occurs in a repeating, rolling pattern.

This means that the pixels of both the first and the second group are illuminated during the whole readout process. The rolling shutter mode enables a high resolution of the image sensor. Therefore, also the accuracy of the image sensor arrangement is increased. Moreover, a readout circuit configured for rolling shutter mode requires less space compared to a readout circuit configured for global shutter mode.

In an embodiment, the pixels of the first group are configured to be read out by the readout circuit in a rolling shutter mode. The pixels of the second group are configured to be read out by the readout circuit in a global shutter mode via a transfer unit.

The transfer unit can be understood as part of the readout circuit. The transfer unit can be arranged next to the readout circuit within the readout layer. The transfer unit and the readout circuit can be integrated in the same substrate. For example, the transfer unit can be arranged in the vertical direction under the array of pixels of the second group. The readout circuit can be arranged at a periphery of the readout layer. For example, the readout circuit comprises an analog-to-digital converter, an output interface et cetera. The transfer unit may comprise storage capacitors for storing light induced charge carriers. It may further comprise switches and/or transistors for controlling electrical signals to and from the transfer unit.

In global shutter mode all the pixels of a pixel matrix are exposed during the same time period. After the illumination with electromagnetic radiation the pixels are read out after one another. A significantly shorter illumination time is required than for rolling shutter mode. A shorter illumination time can lead to less power consumption. Moreover, if the image sensor arrangement is comprised by an electronic device operated by users and if infrared light comes from a dedicated light source, the illumination with infrared radiation, in particular SWIR radiation, should be kept short enough for not damaging the eyes of the user.

In an embodiment, the first sensor layer further comprises a control circuit, the control circuit being configured to control electrical signals to/from each pixel of the first group.

This means that the first sensor layer comprises, apart from photodiodes, also circuit parts. In particular, each pixel within the first sensor layer can comprise transistors for controlling electrical signals to and from the respective pixel.

According to some embodiments, each pixel comprises a select transistor that is configured to receive a select signal, such that the pixels of a respective row can be addressed during readout.

According to some embodiments, each pixel comprises at least one transfer transistor, which is configured to receive a transfer signal, such that charge carriers generated by the photodiode are transferred to a floating diffusion node of the respective pixel.

According to some embodiments, each pixel comprises a reset transistor, which is configured to receive a reset signal, such that the floating diffusion node is reset to a pixel supply voltage and any redundant charge carriers are removed.

According to some embodiments, each pixel comprises a source follower to amplify the light induced charge carriers at the floating diffusion node.

According to some embodiments, a pixel may comprise a further transfer transistor. The further transfer transistor may be configured to receive a further transfer signal, such that charge carriers generated by a pixel of the second group, which is electrically connected to the respective pixel of the first group, are transferred to the floating diffusion node.

By means of the control circuit each pixel or each subpixel, respectively, can be controlled individually. This can mean that each pixel/subpixel can be controlled to be read out by the readout circuit. The control circuit can be small, such that it can be integrated within the pixel. Thus, the pixel pitch can be kept small and the photosensitive region covers the main part of each pixel.

In an embodiment, a wiring of the pixels of the first group is arranged at a main surface of the first sensor layer facing the second sensor layer and facing away from a radiation entrance side of the first sensor layer.

This can mean that the rear surface of the first sensor layer faces the incoming electromagnetic radiation. Thus, the image sensor arrangement can be in a BSI configuration. As mentioned above, on the main surface of the first sensor layer an oxide layer can be arranged, where the wiring is embedded. Due to the BSI configuration the wiring is arranged below the photosensitive pixels, such that incoming light is not blocked or scattered by the wiring and can reach the pixels with the photodiodes unhindered. Thus, the image sensor arrangement has a high QE.

In an embodiment, a wiring of the pixels of the second group is arranged at a main surface of the second sensor layer facing the first sensor layer.

This can mean that the first sensor layer and the second sensor layer can be attached to each other (by hybrid bonding) face-to-face, i.e. main surface to main surface. As mentioned above, the first sensor layer and the second sensor layer may comprise a substrate where the photodiodes are arranged. Wirings are embedded in an oxide layer, which is arranged on top of the respective substrate. The first sensor layer and the second sensor layer may be arranged such that the respective oxide layers face each other for a direct bonding process. The wirings within the oxide layers can be utilized to electrically connect the pixels of the first group with the pixels of the second group. This configuration is advantageous if the pixels of both groups are to be operated in a rolling shutter mode, such that the pixels can share the same readout path. In this case, the readout circuit is less space consuming.

In an embodiment, a wiring of pixels of the second group is arranged at a main surface of the second sensor layer facing the readout layer.

This can mean that the second sensor layer and the readout layer can be attached to each other (by hybrid bonding) face-to-face, i.e. main surface to main surface. As mentioned above, the second sensor layer and the readout layer may comprise a substrate where the photodiodes or, respectively, the readout circuit are arranged. Wirings are embedded in an oxide layer, which is arranged on top of the respective substrate. The readout layer and the second sensor layer may be arranged such that the respective oxide layers face each other for a direct bonding process. The wirings within the oxide layers can be utilized to electrically connect the pixels of the second group with parts of the readout layer.

This configuration is advantageous if the pixels of the second group are to be operated in a global shutter mode, such that the pixel of the second group require a separate readout path. In this case, the illumination time of the pixels of the second group can be kept short. Moreover, no hybrid bonding interface between the first and the second sensor layer is required. This in turn leads to less blocking and/or scattering effects for incoming light due to wirings and metal layers at the interface.

Furthermore, an image sensor device is provided that comprises the image sensor arrangement. This means that all features disclosed for the image sensor arrangement are also disclosed for and applicable to the image sensor device and vice-versa.

According to at least one embodiment of the image sensor device, the image sensor device further comprises a light source that is synchronized with the pixels of the second group. This can mean, that the light source is configured to emit electromagnetic radiation when the pixels of the second group are operated and detect electromagnetic radiation. For example, the light source is a SWIR light source that emits light in the short wavelength infrared range. For example, the SWIR light source emits light in a small band around 1400 nm, 1500 nm or 1600 nm. For example, the bandwidth of the emitted light is ±5 nm, ±10 nm or ±50 nm. The emitted wavelengths by the light source may be matched to the transmittance of the dual band filter. The light source may illuminate an object, where at least a part of the emitted rays are reflected. The reflected rays can be detected by the second sensor layer.

In an embodiment, the image sensor can further comprise a control unit which is configured to control the light source and the pixels of the second group simultaneously. In this way, the operation of the light source and of the pixels of the second group is synchronized. By synchronizing the operation of the light source with the pixels of the second group it is possible to minimize the duration of the illumination. Thus, the power consumption of the light source is reduced.

Such an image sensor can be conveniently employed in electronic devices, such as smart phones, tablet computers, laptops, or camera modules. For example, the camera module is configured to operate in the visible domain for photography and/or video capturing and in the infrared domain for 3D imaging and/or identification purposes. Moreover, image sensors with infrared sensitivity can be used in dark environments where video feed is required. Such application reach from mobile phone face unlock to driver monitoring systems. Both can deploy illuminators that are in the SWIR spectrum, so that the phone user/driver is not blinded by the light that is illuminating him/her.

Furthermore, a method for operating an image sensor arrangement is provided. The image sensor arrangement can preferably be employed for the method for operating an image sensor arrangement described herein. This means all features disclosed for the image sensor arrangement and the image sensor device are also disclosed for the method for operating an image sensor arrangement and vice-versa.

According to at least one embodiment of the method for operating an image sensor arrangement, the method comprises exposing a first group of pixels of a first sensor layer to electromagnetic radiation, wherein each pixel of the first group comprises a photodiode configured to detect electromagnetic radiation in a first wavelength range.

The method further comprises transmitting at least a portion of the electromagnetic radiation via the first sensor layer to a second sensor layer. The portion of the electromagnetic radiation corresponds to a second wavelength range being outside a wavelength range detectable by the first sensor layer. For example, the transmitted portion of electromagnetic radiation at least comprises light in the SWIR domain. The transmission of SWIR light can be achieved by SWIR light not or almost not interacting with the sensor material of the first sensor layer.

The method further comprises exposing a second group of pixels of the second sensor layer to the portion of electromagnetic radiation, wherein each pixel of the second group comprises a photodiode configured to detect electromagnetic radiation in the second wavelength range.

The electromagnetic radiation in the second wavelength range can be provided by a light source. The light source can be synchronized with the operation of the pixels of the second group. This means, for example, the light source is operated and emits light only during the time that the photodiodes operate and detect electromagnetic radiation. The light emitted by the light source is reflected by an object, transmitted by the first sensor layer and received by the second sensor layer. The light source can be a SWIR light source.

The method further comprises converting electromagnetic radiation into electrical signals by the photodiodes. Each of the photodiodes converts the electromagnetic radiation into electrical signals during operation.

The method further comprises transferring the electrical signals of the pixels of the first and second group to a readout layer comprising a readout circuit. The electrical signals of the pixels can be transferred to the readout circuit after one another. The electrical signals of the first group of pixels can be transferred to the readout circuit via a same readout path as the electrical signals of the second group of pixels. Alternatively, the electrical signals of the first group of pixels can be transferred to the readout circuit via a separate readout path that is different from the readout path used for the electrical signals of the second group of pixels. The readout paths can be provided by means of through-substrate-vias and/or hybrid bonding interfaces.

Further embodiments of the method become apparent to the skilled reader from the embodiments of the image sensor arrangement described above.

BRIEF DESCRIPTION OF THE DRAWINGS

The following description of figures may further illustrate and explain aspects of the improved image sensor arrangement and method of operating the same. Components and parts of the image sensor arrangement that are functionally identical or have an identical effect are denoted by identical reference symbols. Identical or effectively identical components and parts might be described only with respect to the figures where they occur first. Their description is not necessarily repeated in successive figures.

FIG. 5 shows a schematic of an image sensor device comprising an image sensor arrangement.

DETAILED DESCRIPTION

Figure 1:
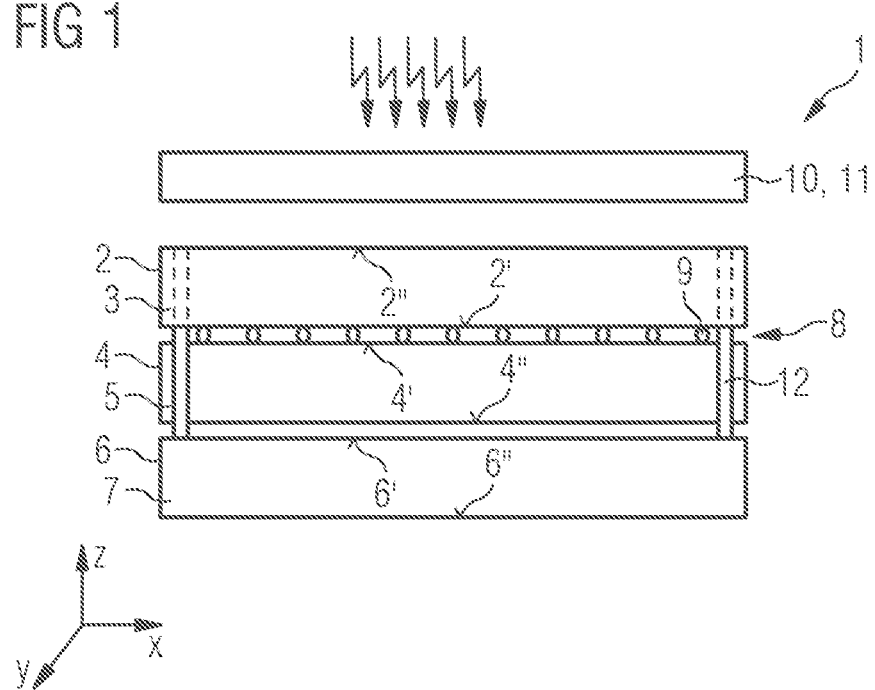
FIG. 1 shows an exemplary embodiment of an image sensor arrangement.

FIG. 1 shows an exemplary embodiment of an image sensor arrangement 1. The image sensor arrangement 1 comprises a first sensor layer 2 comprising a first group of pixels 3, each pixel 3 of the first group comprising a photodiode (not shown) configured to detect electromagnetic radiation (indicated with arrows above the image sensor device) in a first wavelength range. The image sensor arrangement 1 further comprises a second sensor layer 4 comprising a second group of pixels 5, each pixel 5 of the second group comprising a photodiode (not shown) configured to detect electromagnetic radiation in a second wavelength range. The image sensor arrangement 1 further comprises a readout layer 6 comprising a readout circuit 7 being configured to read out electrical signals from the pixels 3, 5 of the first and the second group. The second sensor layer 4 is arranged between the first sensor 2 layer and the readout layer 6. The second wavelength range is outside a wavelength range detectable by the first sensor layer 2.

The first sensor layer 2, the second sensor layer 4 and the readout layer 6 each have a main plane of extension. The main planes of extension may be in parallel to each other, as shown in FIG. 1. The main planes of extension may extend in lateral directions x, y. In a vertical direction z, which refers to a direction running perpendicular to the main planes of extension, the first sensor layer 2, the second sensor layer 4 and the readout layer 6 are arranged on top of each other to form a stack. The second sensor layer 4 is arranged on top of the readout layer 6. The first sensor layer 2 is arranged on top of the second sensor layer 4. The first sensor layer 2 is arranged between the second sensor layer 4 and incoming electromagnetic radiation.

The first sensor layer 2 comprises a main surface 2' and a rear surface 2". A wiring (not shown) of the first group of pixels may be arranged at the main surface 2' of the first sensor layer 2. In the embodiment shown in FIG. 1 the first sensor layer 2 is arranged such that its rear surface 2" faces the source of electromagnetic radiation. The main surface 2' of the first sensor layer 2 faces the second sensor layer 4. However, in other embodiments (not shown) the first sensor layer 2 can be arranged the other way around.

The second sensor layer 4 comprises a main surface 4' and a rear surface 4". A wiring of the second group of pixels 5 may be arranged at the main surface 4' of the second sensor layer 4. In the embodiment shown in FIG. 1 the second sensor layer 4 is arranged such that its rear surface 4" faces the readout layer 6. The main surface 4' of the second sensor layer 4 faces the first sensor layer 2. However, in other embodiments (e.g. shown in FIG. 2) the second sensor layer 4 can be arranged the other way around.

The readout layer 6 comprises a main surface 6' and a rear surface 6". A wiring of the readout circuit 7 may be arranged at the main surface 6' of the readout layer 6. In the embodiment shown in FIG. 1 the readout layer 6 is arranged such that its main surface 6' faces the second sensor layer 4.

FIG. 1 further shows a hybrid bonding interface 8. By means of the hybrid bonding interface 8 the first sensor layer 2 is attached to the second sensor layer 4. For example, the hybrid bond can be established by means of an adhesive. In another example, bonding can be conducted in course of a direct bonding, or fusion bonding process with an oxide layer interface.

The hybrid bonding interface 8 comprises electrical interconnections 9, such that the pixels 3 of the first group and the pixels 5 of the second group can be electrically connected with each other. For example, the electrical interconnections 9 are metal bumps (e.g. solder bumps) which are embedded in an adhesive. The electrical interconnections 9 may also be metal pads that are processed in parallel with a respective dielectric bonding layer, e.g. an oxide layer.

In this case, electrical contacting can be achieved during annealing via metal diffusion bonding.

Implementing a bonding interface is not limited to the proposed examples. In general, any bonding technique can be used, where a permanent bond between two layers is established that combines a dielectric bond with an embedded metal to form electrical interconnections 9.

FIG. 1 further shows an optical element 10. The optical element 10 may comprise a dual band filter 11. The dual band filter 11 is arranged between the first sensor layer and the incoming electromagnetic radiation to be detected. This means that in the vertical direction z the dual band filter 11 is arranged on or above the first sensor layer 2, such that the first sensor layer 2 is arranged between the dual band filter 11 and the second sensor layer 4. The dual band filter 11 may be directly attached to the first sensor layer 2 or be arranged in a predefined distance to the first sensor layer 2, as shown in FIG. 1. The dual band filter 11 is configured to block electromagnetic radiation apart from at least a portion of the first wavelength range (e.g. visible light) and at least a portion of the second wavelength range (e.g. SWIR light).

Instead or in addition, the optical element 10 comprises a lens or an array of lenses. The lens or the array of lenses are configured to direct incoming light towards the first sensor layer 2 and the second sensor layer 4. The lens or the array of lenses can be used to direct the light through openings of metal layers (for example metal layers comprised by the pixel wirings or the hybrid bonding interface 8) between the first sensor layer 2 and the second sensor layer 4. The lens can be a microlens, and the array of lenses can be an array of microlenses.

FIG. 1 further shows two through-substrate-vias 12 (TSV). The TSVs 12 penetrate the second sensor layer 4 and electrically connects the pixels 3 of the first group in the first sensor layer 2 with the readout circuit 7 in the readout layer 6. Each TSV 12 completely penetrates the second sensor layer. This means that the TSV 12 reaches from the main surface 4' to the rear surface 4" of the second sensor layer 4.

In addition, the TSVs 12 may completely penetrate also the first sensor layer 2, as indicated by dashed lines. In this case, the TSVs 12 reach from the rear surface 2" of the first sensor layer to the rear surface 4" of the second sensor layer 4.

The TSVs 12 provide a readout path for reading out the electrical signals of the pixels 3 of the first group. In some embodiments, also the electrical signals from the pixels of the second group are read out via the TSV 12. Each TSV 12 can be electrically connected to only one pixel 3. It is also possible that each TSV 12 is electrically connected to more than one pixel 3. FIG. 1 only shows two TSVs 12 by way of example. However, the image sensor arrangement 1 may comprise a plurality of TSVs, each TSV 12 being electrically connected to one or more pixel 3.

Figure 2:
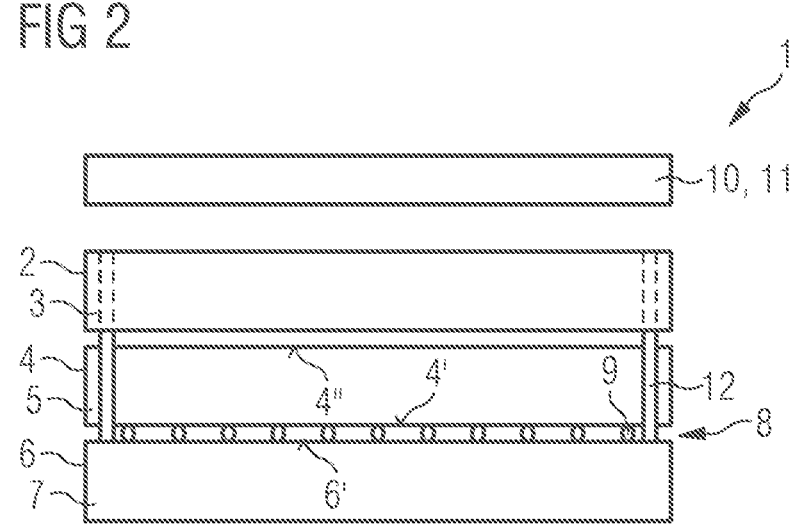
FIG. 2 shows another exemplary embodiment of an image sensor arrangement.

In FIG. 2 another embodiment of an image sensor arrangement 1 is shown. The embodiment according to FIG. 2 is different from the embodiment of FIG. 1 in that no hybrid bonding interface 8 is between the first sensor layer 2 and the second sensor layer 4. Instead, a hybrid bonding interface 8 is between the second sensor layer 4 and the readout layer 6. In particular, the main surface 4' of the second sensor layer 4 is attached to the main surface 6' of the readout layer 6 by hybrid bonding.

The hybrid bonding interface 8 comprises electrical interconnections 9, such that the pixels 5 of the second group can be electrically connected to parts of the readout layer 6. As already described, the electrical interconnections 9 can be metal bumps (e.g. solder bumps) which are embedded in an adhesive. The electrical interconnections 9 may also be metal pads that are processed in parallel with a respective dielectric bonding layer, e.g. an oxide layer. In this case, electrical contacting can be achieved during annealing via metal diffusion bonding. By means of the electrical interconnections 9 a separate readout path for the pixels 5 of the second group in provided, beside the readout path for the pixels 3 of the first group via the TSVs 12.

Figure 3:
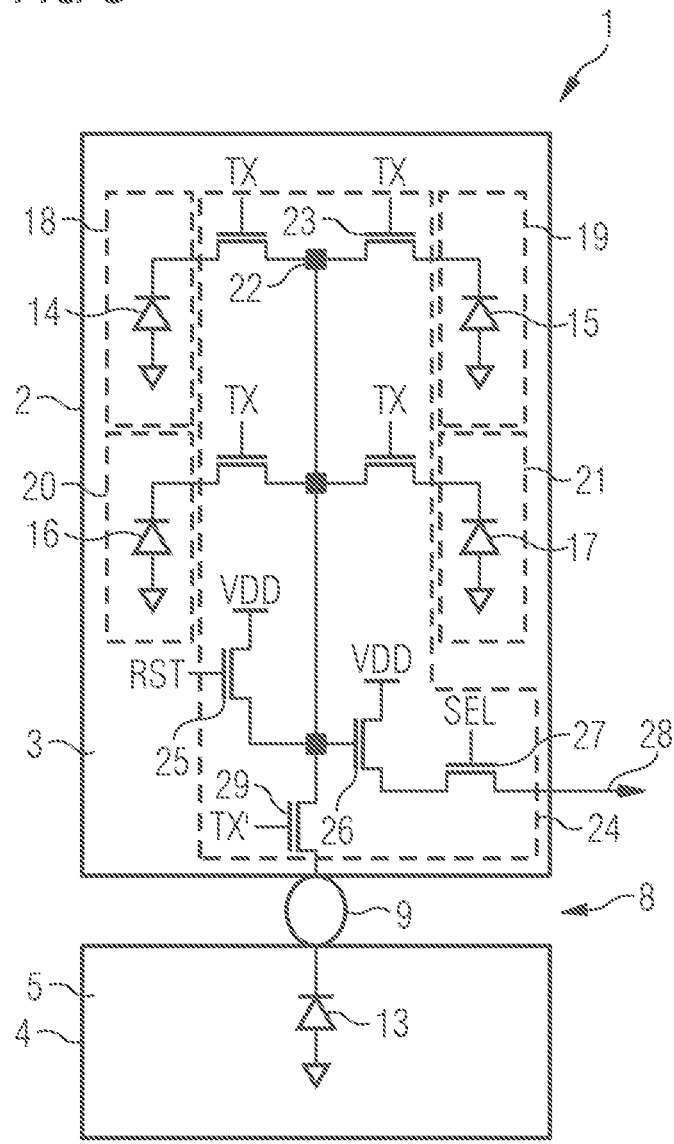
FIG. 3 shows a schematic according to an embodiment of an image sensor arrangement.

In FIG. 3 a detail of the embodiment according to FIG. 1 is shown schematically. Only the first sensor layer 2 and the second sensor layer 4 are shown, including the hybrid bonding interface 8. The readout layer 6 is omitted for sake of illustration. In FIG. 3 it is illustrated how a pixel 5 of the second group (e.g. a SWIR pixel) is electrically connected to a pixel 3 of the first group (e.g. a visible light pixel or RGB pixel). Further pixels 3, 5 can be electrically connected in the same or similar way.

In the following, the pixels of the second group are referred to as SWIR pixels 3, even though these pixels may detect a different wavelength range. Correspondingly, the pixels 3 of the first group are referred to as visible light pixels 5. It is noted, that the image sensor arrangement 1 is however not limited to visible light and SWIR light detection.

In FIG. 3 the second sensor layer 4 comprises one pixel 5 of the second group, e.g. one SWIR pixel 5. The SWIR pixel 5 comprises a photodiode 13. For example, the photodiode 13 is a pinned photodiode 13. Apart from photodiodes 13 comprised by SWIR pixels 5, the second sensor layer 4 may be free from circuit parts, such as transistors or the like.

The photodiode 13 is configured to detect electromagnetic radiation and to convert it into an electrical signal. On its anode side, the photodiode 13 is electrically connected to an electric potential, e.g. a ground potential. On its cathode side, the photodiode 13 is electrically connected to the pixel 3 of the first group via the electrical interconnection 9 of the hybrid bonding interface 8.

The visible light pixel 3 in the first sensor layer 2 of the embodiment of FIG. 3 comprises four subpixels 18-21 with respective photodiodes 14-17. However, other pixel architectures are also possible. For example, the visible light pixel 3 may comprise only one photodiode or it may comprise more photodiodes. Each of the photodiodes may be configured to detect light in the same wavelength range or in different wavelength ranges. As such, the configuration shown in FIG. 3 has to be understood only as exemplary embodiment.

The visible light pixel 3 of FIG. 3 may comprise a first subpixel 18 comprising a photodiode 14 being configured to detect and convert electromagnetic radiation in the red wavelength range. The visible light pixel 3 may further comprise a second and a third subpixel 19, 20 comprising a respective photodiode 15, 16 being configured to detect and convert electromagnetic radiation in the green wavelength range. And the visible light pixel 3 may further comprise a fourth subpixel 21 comprising a photodiode 17 being configured to detect and convert electromagnetic radiation in the blue wavelength range. Again, the pixels are not limited to RGB, other wavelength ranges are also possible.

Each of the photodiodes 14-17 are electrically connected on their anode side to an electric potential, e.g. a ground potential. The subpixels 18-21 may share a common floating diffusion node 22. On their cathode side, the photodiodes 14-17 are electrically connected to the floating diffusion node 22 via a respective transfer transistor 23, which is controlled by a respective transfer signal TX.

In the pixel architecture according to FIG. 3, the transfer transistor 23 is comprised by a control circuit 24. The control circuit 24 further comprises a reset transistor 25, which is configured to receive a reset signal RST at its gate, such that the floating diffusion node 22 is reset to a pixel supply voltage VDD and any redundant charge carriers are removed.

The control circuit 24 further comprises a source follower 26 to amplify the light induced charge carriers at the floating diffusion node 22.

The control circuit 24 further comprises a select transistor 27, which is configured to receive a select signal at its gate, such that the pixel 3 can be addressed during readout. The select transistor 27 is connected to the source follower 26 at one side and to a readout path 28 at the other side (including the TSV 12 as shown in FIG. 1).

In the embodiment according to FIG. 3, the control circuit 24 further comprises a further transfer transistor 29. The further transfer transistor 29 may be configured to receive a further transfer signal TX', such that charge carriers generated by the SWIR pixel 5, which is electrically connected to the respective visible light pixel 3, are transferred to the floating diffusion node 22. As such, the SWIR pixel 5 and the visible light pixel 3 share a common floating diffusion node 22 as well as a common readout path 28.

Figure 4:
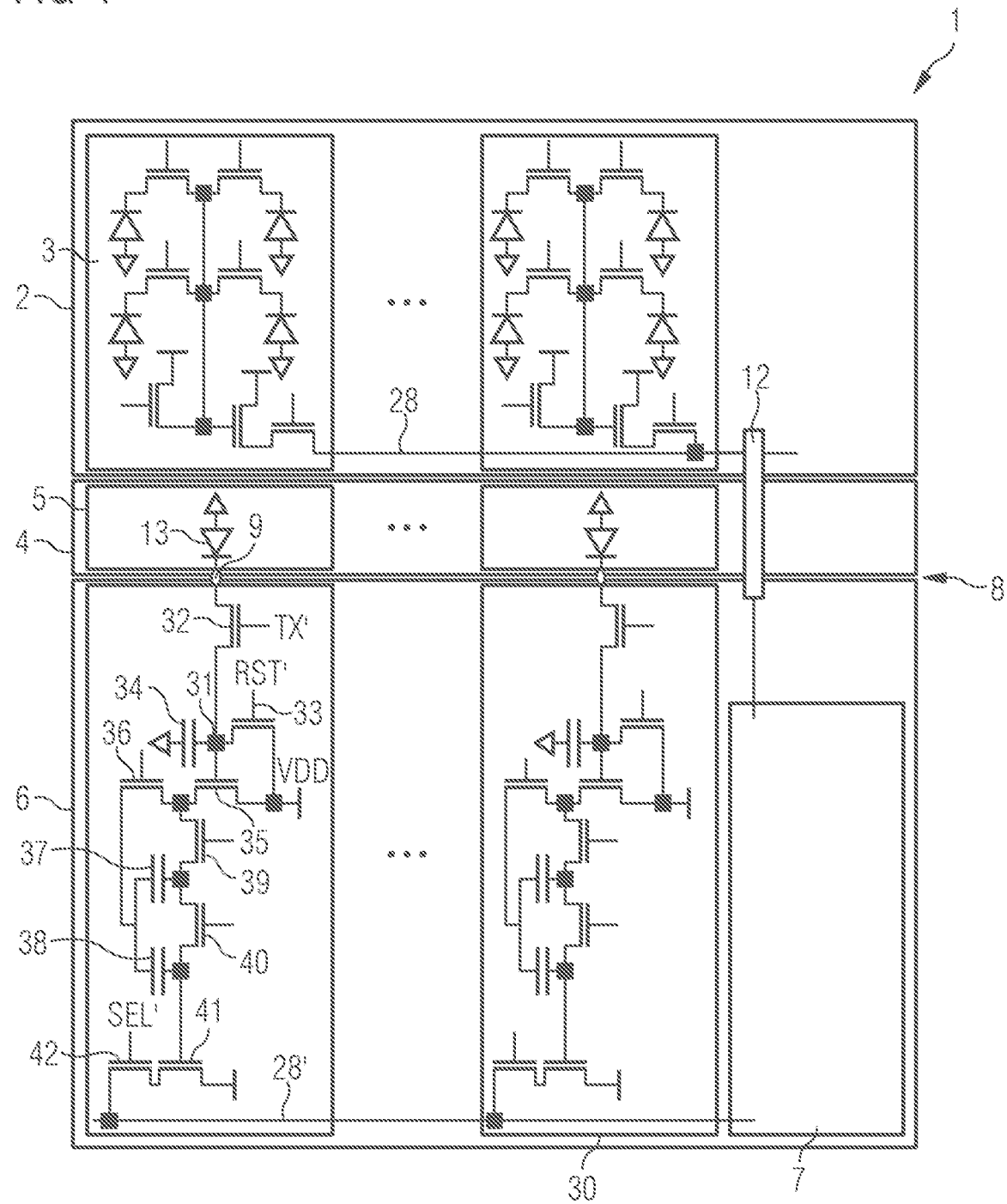
FIG. 4 shows another schematic according to an embodiment of an image sensor arrangement.

In FIG. 4 a detail of the embodiment according to FIG. 2 is shown schematically. In FIG. 4, several SWIR pixels 5 of one row of an array of SWIR pixels 5 are shown. Correspondingly, several visible pixels 3 of one row of an array of visible light pixels 3 are shown. The full rows are indicated by ellipses.

In the embodiment according to FIG. 4 the SWIR pixels 5 are not electrically connected to the visible light pixels 3 via a hybrid bonding interface 8. As such, the SWIR pixels 5 do not share a common readout path with the visible light pixels 3. Instead, the visible light pixels 3 are read out by the readout circuit 7 via a separate readout path 28, while the SWIR pixels 5 are read out by the readout circuit 7 via a transfer unit 30. As such, there is are electric interconnections 9 between the second sensor layer 4 and the readout layer 6 by means of an hybrid bonding interface 8.

The transfer unit 30 can be arranged next to the readout circuit 7 in the readout layer 6. In the example of FIG. 4, the transfer unit 30 is arranged under the array of SWIR pixels 5. The readout circuit 7 is arranged at a periphery of the readout layer 6. The transfer unit 30 may be configured such that the SWIR pixels 5 can be read out in global shutter mode. The transfer unit 30 may comprise storage capacitors for storing light induced charge carriers. It may further comprise switches and/or transistors for controlling electrical signals to and from the transfer unit 30.

In FIG. 4 one exemplary transfer unit architecture for each SWIR pixel 5 is shown. However, the embodiment is not limited to the shown transfer unit architecture and other architectures are likewise possible. Each SWIR pixel 5 is assigned to one respective transfer unit 30. The transfer units 30 are connected via a readout path 28', which is connected to the readout circuit 7.

The photodiode 13 of the SWIR pixel 5 is electrically connected to a floating diffusion node 31 in the readout layer 6 via an optional transfer transistor 32, which is controlled by a transfer signal TX'. The transfer transistor 32 can also be omitted. The transfer unit 30 further comprises a reset transistor 33, which is configured to receive a reset signal RST', such that the floating diffusion node 31 is reset to a pixel supply voltage VDD and any redundant charge carriers are removed. A floating diffusion capacitance 34 stores the charge carriers at the floating diffusion node 31. The transfer unit 30 further comprises a first source follower 35 to amplify the light induced charge carriers at the floating diffusion node 31.

A pre-charge transistor 36 acts as a current source load for the first source follower 35. Besides, it is also used to pre-charge sample capacitors 37, 38. The switches 39, 40 together with the first sample capacitor 37 and the second sample capacitor 38 implement a sample and hold functionality of the SWIR pixel 5. A second source follower 41 buffers the sample signals to the readout path 28'. And a row select transistor 42 is configured to receive a select signal SEL' at its gate, such that the pixel 5 can be addressed during readout.

As shown in FIG. 4, the architecture of the visible light pixels 3 in that embodiment can be the same or similar as in the embodiment of FIG. 3. The visible light pixels 3 of the illustrated row are electrically connected via the readout path 28. The readout path 28 is electrically connected to the readout circuit 7 via the TSV 12. In this configuration the visible light pixels 3 can be operated in rolling shutter mode, while the SWIR pixels 5 can be operated in global shutter mode.

FIG. 5 shows a schematic diagram of an exemplary embodiment of an image sensor device 43 comprising the image sensor arrangement 1 as discussed above. The first group of pixels 3 and the second group of pixels 5 of the image sensor arrangement 1 can be arranged in a respective two-dimensional array, as indicated in FIG. 5. The image sensor device 43 further comprises a light source 44 that is synchronized with the pixels 5 of the second group. For example, the light source emits light in the SWIR range. The image sensor device 43 further comprises a control unit 45 which is configured to control the light source 44 and the second group of pixels 5.

The embodiments of the image sensor arrangement 1 and the method of operating the image sensor arrangement 1 disclosed herein have been discussed for the purpose of familiarizing the reader with novel aspects of the idea. Although preferred embodiments have been shown and described, many changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

This patent application claims the priority of German patent application 102021107730.3, the disclosure content of which is hereby incorporated by reference.

REFERENCE SYMBOLS 1 image sensor arrangement
2 first sensor layer
2' main surface of first sensor layer
2" rear surface of first sensor layer
3 pixel of the first group
4 second sensor layer 4' main surface of second sensor layer
4" rear surface of second sensor layer
5 pixel of the second group
6 readout layer
6' main surface of readout layer
6" rear surface of readout layer
7 readout circuit
8 bonding interface
9 electrical interconnection
10 optical element
11 dual band filter
12 through-substrate via
13-17 photodiode
18-21 subpixel
22 floating diffusion node
23 transfer transistor
24 control circuit
25 reset transistor
26 source follower
27 select transistor
28, 28' readout path
29 further transfer transistor
30 transfer unit
31 floating diffusion node
32 transfer transistor
33 reset transistor
34 floating diffusion capacitance
35 first source follower
36 pre-charge transistor
37 first capacitor
38 second capacitor
39 first switch
40 second switch
41 second source follower
42 select transistor
43 image sensor device
44 light source
45 control unit
RST, RST' reset signal
SEL, SEL' select signal
TX, TX' transfer signal
VDD supply voltage
x, y lateral directions
z vertical direction

The invention claimed is:

1. An image sensor arrangement, comprising:
a first sensor layer comprising a first group of pixels, each pixel of the first group comprising a photodiode configured to detect electromagnetic radiation in a first wavelength range,
a second sensor layer comprising a second group of pixels, each pixel of the second group comprising a photodiode configured to detect electromagnetic radiation in a second wavelength range,
a readout layer comprising a readout circuit being configured to read out electrical signals from the pixels of the first and the second group, wherein the second sensor layer is arranged between the first sensor layer and the readout layer, and wherein the second wavelength range is outside a wavelength range detectable by the first sensor layer, and
a dual band filter being arranged between the first sensor layer and a source of electromagnetic radiation to be detected, the dual band filter being configured to block electromagnetic radiation apart from at least a portion of the first wavelength range and at least a portion of the second wavelength range,
wherein the first sensor layer is attached to the second sensor layer by hybrid bonding, such that electrical interconnections are formed between the pixels of the first group and the pixels of the second group.

2. The image sensor arrangement according to claim 1, wherein the first wavelength range comprises visible light, and wherein the second wavelength range comprises short wavelength infrared radiation, SWIR.

3. The image sensor arrangement according to claim 1, wherein the second sensor layer is attached to the readout layer by hybrid bonding, such that electrical interconnections are formed between the pixels of the second group and the readout circuit.

4. The image sensor arrangement according to claim 1, further comprising at least one through-substrate-via, the through-substrate-via penetrating the second sensor layer and electrically connecting the pixels of the first group in the first sensor layer with the readout circuit in the readout layer.

5. The image sensor arrangement according to claim 1, wherein the first sensor layer and/or the readout layer comprises a semiconductor material, in particular silicon.

6. The image sensor arrangement according to claim 1, wherein the second sensor layer comprises one of germanium, indium gallium arsenide and a quantum dot layer, or any other material having a suitable bandgap for spectral response to electromagnetic radiation in the second wavelength range.

7. The image sensor arrangement according to claim 1, wherein the pixels of the first group and the pixels of the second group are configured to be read out by the readout circuit in a rolling shutter mode.

8. The image sensor arrangement according to claim 1, wherein the pixels of the first group are configured to be read out by the readout circuit in a rolling shutter mode, and the pixels of the second group are configured to be read out by the readout circuit in a global shutter mode via a transfer unit.

9. The image sensor arrangement according to claim 1, wherein the first sensor layer further comprises a control circuit, the control circuit being configured to control electrical signals to/from each pixel of the first group.

10. The image sensor arrangement according to claim 1, wherein a wiring of the pixels of the first group is arranged at a main surface of the first sensor layer facing the second sensor layer and facing away from a radiation entrance side of the first sensor layer.

11. The image sensor arrangement according to claim 1, wherein a wiring of the pixels of the second group is arranged at a main surface of the second sensor layer facing the first sensor layer.

12. The image sensor arrangement according to claim 1, wherein a wiring of pixels of the second group is arranged at a main surface of the second sensor layer facing the readout layer.

13. An image sensor device comprising the image sensor arrangement according to claim 1, and a light source that is synchronized with the pixels of the second group.

14. The image sensor arrangement according to claim 1, wherein the pixels of the second group and the pixels of the first group share a common floating diffusion node as well as a common readout path.

15. A method for operating an image sensor arrangement, the method comprising the steps of:
- blocking, by a dual band filter, electromagnetic radiation apart from at least a portion of a first wavelength range and at least a portion of a second wavelength range,
- exposing a first group of pixels of a first sensor layer to electromagnetic radiation transmitted by the dual band filter, wherein each pixel of the first group comprises a photodiode configured to detect electromagnetic radiation in the first wavelength range,
- transmitting at least a portion of the electromagnetic radiation transmitted by the dual band filter via the first sensor layer to a second sensor layer, wherein the portion of the electromagnetic radiation corresponds to the second wavelength range being outside a wavelength range detectable by the first sensor layer,
- exposing a second group of pixels of the second sensor layer to the portion of electromagnetic radiation, wherein each pixel of the second group comprises a photodiode configured to detect electromagnetic radiation in the second wavelength range,
- converting electromagnetic radiation into electrical signals by the photodiodes,
- transferring the electrical signals of the pixels of the first and second group to a readout layer comprising a readout circuit,
- wherein the first sensor layer is attached to the second sensor layer by hybrid bonding, such that electrical interconnections are formed between the pixels of the first group and the pixels of the second group.

16. An image sensor arrangement, comprising:
- a first sensor layer comprising a first group of pixels, each pixel of the first group comprising a photodiode configured to detect electromagnetic radiation in a first wavelength range,
- a second sensor layer comprising a second group of pixels, each pixel of the second group comprising a photodiode configured to detect electromagnetic radiation in a second wavelength range,
- a readout layer comprising a readout circuit being configured to read out electrical signals from the pixels of the first and the second group,
- wherein the second sensor layer is arranged between the first sensor layer and the readout layer, and wherein the second wavelength range is outside a wavelength range detectable by the first sensor layer, and
- a dual band filter being arranged between the first sensor layer and a source of electromagnetic radiation to be detected, the dual band filter being configured to block electromagnetic radiation apart from at least a portion of the first wavelength range and at least a portion of the second wavelength range,
- wherein the first sensor layer is attached to the second sensor layer by hybrid bonding, such that electrical interconnections are formed between the pixels of the first group and the pixels of the second group, wherein the pixels of the second group and the pixels of the first group share a common floating diffusion node as well as a common readout path.

* * * * *